Figure 1:
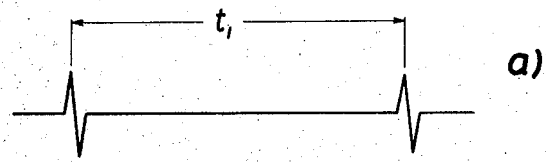
Figure 1:
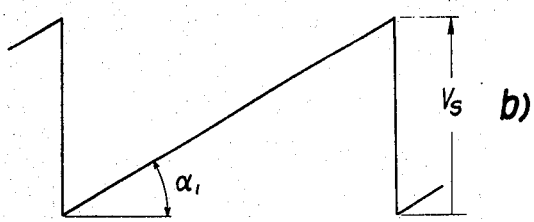

United States Patent

[11] 3,617,869

[72] Inventors Reimar Germann;
 Siegbert Haase, both of Graz, Austria
[21] Appl. No. 824,643
[22] Filed May 14, 1969
[45] Patented Nov. 2, 1971
[73] Assignee Hans List
 Graz, Austria
[32] Priority Apr. 18, 1969
[33] Austria
[31] A 3802/69

[54] CIRCUITRY FOR THE PRODUCTION OF A SPEED-PROPORTIONAL DEFLECTING VOLTAGE
 1 Claim, 6 Drawing Figs.
[52] U.S. Cl. .................................................. 324/15
[51] Int. Cl. .................................................. G01m 15/00
[50] Field of Search .......................................... 324/15, 16,
 121; 73/116-119; 328/185; 307/228

[56] References Cited
 UNITED STATES PATENTS
2,948,857 8/1960 Welcome ..................... 324/16
3,360,744 12/1967 Blitz ............................. 328/185
2,604,515 7/1952 McNulty ...................... 324/16

Primary Examiner—Michael J. Lynch
Attorney—Watson, Cole, Grindle & Watson

ABSTRACT: A circuit for the generation of a deflecting voltage for the time-base deflection of an oscilloscope, which deflection is proportional to the speed of an engine and including a sawtooth generator controlled by the input pulses of a speed sensor on the engine. A variable attenuator regulates the slope of the sawtooth generator deflecting voltage so as to vary the frequency of the sawtooth voltage in accordance with the repetition rate of the engine ignition signals.

PATENTED NOV 2 1971 3,617,869

SHEET 1 OF 4

Inventors
Reimer Germann
By Siegbert Haase
Watson, Cole, Grindle & Watson
Attys.

CIRCUITRY FOR THE PRODUCTION OF A SPEED-PROPORTIONAL DEFLECTING VOLTAGE

The invention relates to a circuit for the production of a deflecting voltage for the time-base deflection of an oscilloscope which is proportional to the speed of an engine, comprising a sawtooth generator controlled by the input pulses of a speed sensor provided on the engine and supplying the deflecting voltage.

For the monitoring of engines, as for example, for the indication of internal combustion engines, it is desirable to obtain a time-base deflection of oscilloscopes which is proportionate to the speed of the engine. Speed-proportional time-base deflection of the oscilloscope offers the advantage of ensuring the proper deflection of the oscilloscope even at varying speeds of the engine to be examined in such a manner that the same crank angle range, as for example, of 90°, is reproduced time and again. As a result, the deflection time need not be readjusted as usually required.

For that purpose, according to conventional methods, the engine is provided with a device producing a deflecting voltage which is proportional to the speed of the engine. A drawback of similar arrangements resides in the fact that it is necessary to equip the engine to be examined with a complicated device requiring considerable space and consequently, subject to engine vibrations and therefore, liable to break down occasionally.

These shortcomings and drawbacks of conventional devices are avoided according to the present invention which provides for the input pulses transformed into trigger pulses of the same repetition frequency being supplied to the input of the sawtooth generator, the speed sensor being connected to a circuit known per se and generating a speed-proportional DC voltage, to the output of which a variable attenuator connected to the sawtooth generator is connected, the said variable attenuator influencing the charging voltage, the resistance or the capacity of the frequency-determining RC member of the sawtooth generator in such a manner that the amplitude of the sawtooth voltage will remain the same at all speeds. The deflecting frequency is thus automatically set as a function of the speed of the engine to be examined in such a manner as to be proportionate to the engine speed. This offers a particular advantage insofar as for the control of this circuit only the trigger signals required for all oscilloscope deflecting circuits are used. This results in an extremely simple composition of the circuitry to be arranged in any safe location at a distance from the engine.

According to a preferred embodiment of the invention, the circuitry comprises a circuit generating the speed-proportional DC voltage including a Schmitt trigger whose output is connected to the input of the sawtooth generator on the one hand, and to the input of a monostable switch step on the other hand, the latter being in turn connected to an integrator, preferably a Miller integrator. The Schmitt trigger serves to transform the input pulses of the speed sensor into the rectangular pulses needed for triggering the sawtooth generator, the said rectangular pulses being of a constant amplitude and having the same repetition sequence as the input pulses, their width depending on the type of input pulses generated. These trigger pulses are simultaneously used for the generation of the speed-proportional DC voltage, a rectangular voltage of a constant amplitude being generated at the output of the monostable switch step. The duration of the output voltage of the monostable switch step is also constant and dependent upon the speed of the engine and/or on the pulse repetition frequency at the input of the circuit. These rectangular pulses of constant amplitude and duration are transformed into the required DC voltage in the subsequent integration circuit which in its simplest form may be a capacitor, the amplitude of the said DC voltage being proportionate to the speed of the engine to be examined. This conventional circuit element for the generation of a speed-proportional DC voltage may be replaced by any other suitable device, such as a generator. The trigger pulses required for the operation of the sawtooth generator are then generated separately as distinct from the device for the generation of the speed-proportional DC voltage.

According to an embodiment of the invention, a sawtooth generator comprises a variable attenuator influencing the charging voltage of the sawtooth generator, the said attenuator consisting of an operational amplifier designed as a differential amplifier, one of whose difference inputs is connected to the output of the circuit generating the speed-proportional DC voltage, the second difference input being provided between the two partial resistances of a voltage regulator connected to the output of the operational amplifier. Consequently, the inputs of the operational amplifier show the actual value taken from the output voltage by means of the voltage regulator on the one hand, and the rated value which is proportional to the speed of the engine, on the other hand. This value represents a speed-dependent reference input. The output voltage which also constitutes the charging voltage of the sawtooth generator is therefore, stabilized to a determined value for a certain speed of the engine. Consequently, any alteration of the input pulses will result in a corresponding change of the charging voltage. The required constant amplitude of the sawtooth voltage is obtainable with a high degree of precision by appropriately balancing the circuit elements involved in the operation.

According to a further embodiment of the invention, an additional feedback control system for the control of the slope of the sawtooth voltage provided comprises a differentiating circuit connected to the output of the sawtooth generator and supplying a DC voltage proportionate to the slope of the sawtooth voltage to one of the difference inputs of a subsequent operational amplifier, the second difference input of which is provided between the partial resistances of the voltage regulator, and whose output is connected to the second difference input of the operational amplifier of the variable attenuator. By determining the slope of the sawtooth and by introducing a DC voltage proportionate to the slope for the regulation of the charging voltage it is possible to substantially increase the precision of the relationship between the engine speed and the slope of the sawtooth.

Figure 2:
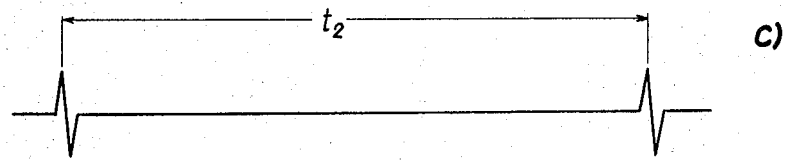
Figure 2:
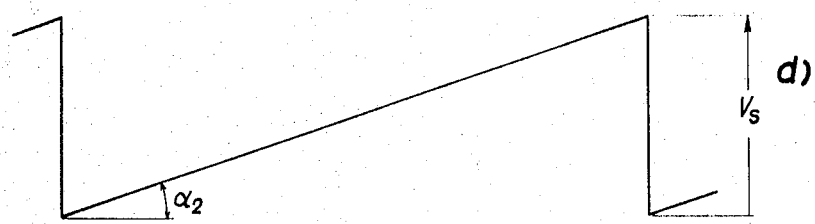
Figure 2:
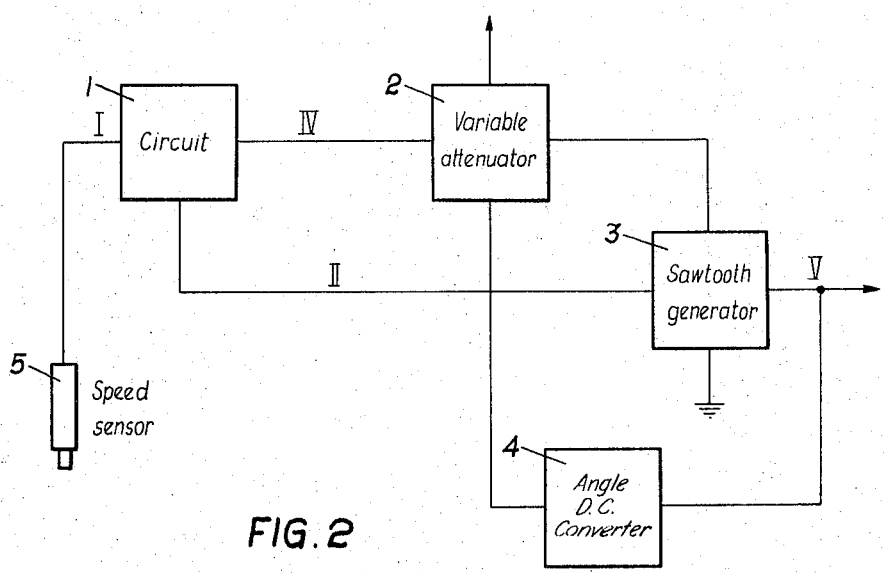
Figure 3:
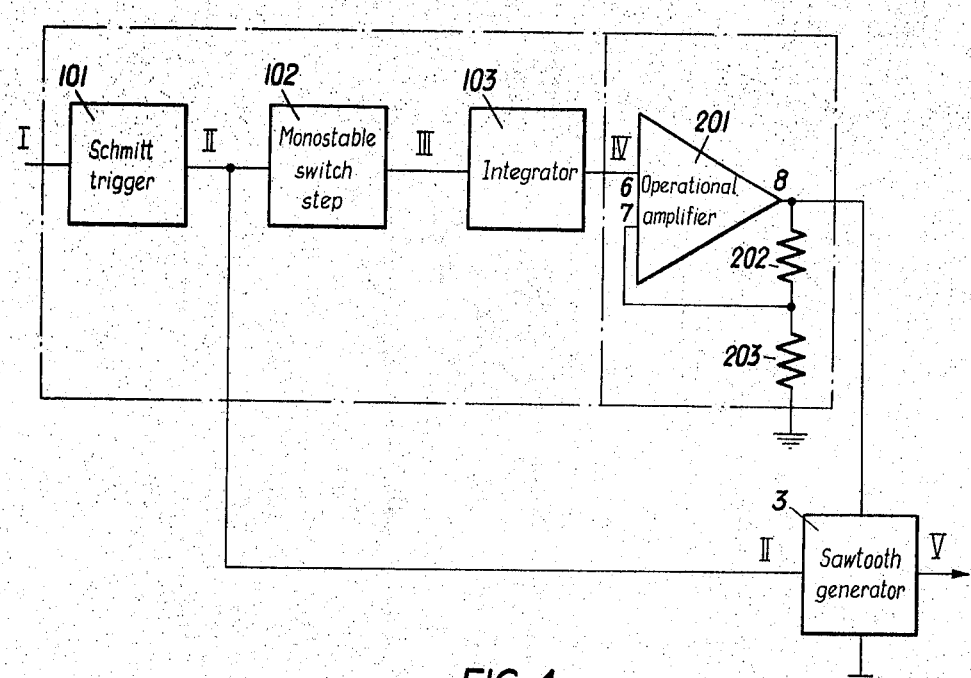
Figure 4:
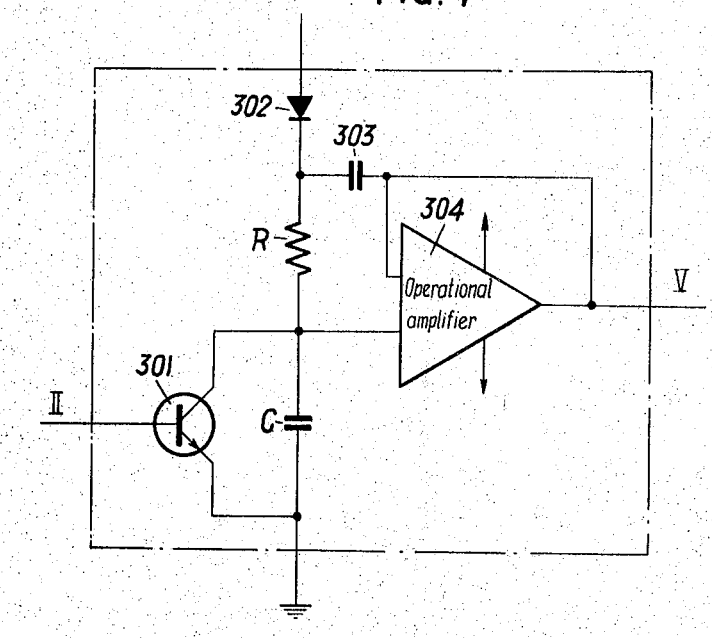
Figure 5:
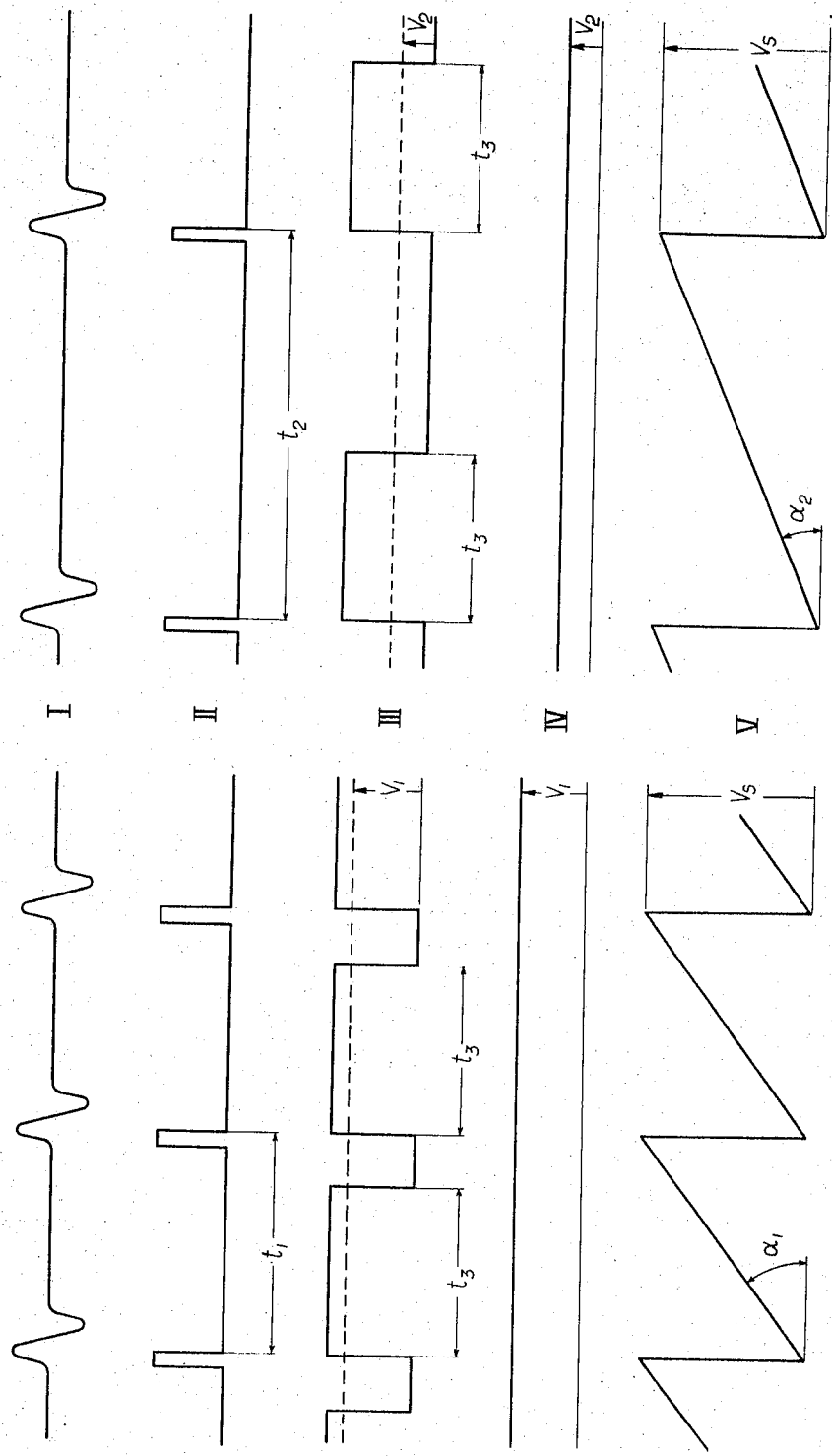

Further details of the invention will become apparent from the following description with reference to the accompanying schematic drawing in which:

FIG. 1 illustrates the relationship between the input pulses and the sawtooth voltage at two different speeds of the engine to be examined, FIG. 2 is a block diagram of the circuitry according to the invention, FIGS. 3 and 4 are details of the circuitry shown in FIG. 2, FIG. 5 shows a pulse pattern for the circuits illustrated in FIGS. 2 to 4 and FIG. 6 an enlarged circuitry according to the invention including additional control of the slope of the sawtooth voltage.

FIG. 1a shows the input pulses generated by the speed sensor, such as for example, by an electromagnetic or photoelectric pulse generator for a certain speed of the engine to be examined. The time intervals between consecutive input pulses, corresponding for example, to one revolution on the engine shaft, is defined by the time $t_1$. FIG. 1b shows the sawtooth voltage derived from the input pulses according to FIG. 1a. For the X-deflection of the electron ray tube controlled by the sawtooth generator a sawtooth voltage having a certain amplitude $V_S$ is required depending on its sensitivity. Consequently, it will be necessary to attain the amplitude $V_S$ during the time $t_1$. Where a linear ascent of the sawtooth slope is required, this means a slope angle of $\alpha 1$.

For a different speed of the engine which in the present instance is a lower one, the lateral distance between the input pulses is defined by the time $t_2$ as shown in FIG. 1c. In accordance with the aforesaid requirement and as illustrated in FIG. 1d, for a constant sawtooth amplitude $V_S$ and a linear ascent of the sawtooth voltage its slope angle $\alpha 2$ should be smaller than $\alpha 1$.

Consequently, it will be necessary in a circuit where the sawtooth voltage is to be controlled depending on the speed of the engine, to automatically control the slope angle of the sawtooth voltage as a function of speed, that is depending on the time interval between consecutive input pulses, in order to obtain a constant sawtooth amplitude.

In the description that follows the expression "signal" followed by a Roman Numeral refers to the waveforms in FIG. 5 identified as I–V (inclusive). With respect to the waveforms of FIG. 5, the following explanation applies:

Signal I is the input voltage supplied by the pickoff to obtain the rotational speed of the engine, for example, by an electromagnetic or photoelectric pulse generator. Signal I is identical to the input signal shown in an idealized way in FIG. 1a.

Signals II are rectangularly shaped trigger impulses which are produced from the input pulses I in the circuit elements 1 and 101 (respectively shown in FIGS. 2 and 3. The rectangular impulses I have a constant amplitude, the width of which depends on the type of input impulse.

Signal III is a rectangular voltage with a constant amplitude and duration ($t_3$) which is developed at the outlet of the monostable switching stage 102 which had been triggered by signal II.

Signal IV is a direct voltage developed at the outlet of the integration circuit 103, which has been acted upon by signal III, and whose amplitude therefore is proportional to the sequence frequency of the input impulses I.

Signal V is the sawtooth voltage occurring at the outlet of the sawtooth generator 3, which is identical to the output voltage shown in FIG. 1b.

This requirement is met by the circuitry illustrated in FIG. 2, where the input pulses (signal I) supplied by the speed sensor 5 are fed to a circuit 1 of a type known per se, which as shown in FIG. 3, comprises a Schmitt trigger 101, a monostable switch step 102 and an integrator 103. The Schmitt trigger 101 transforms the input pulses (signal I) into rectangular trigger pulses (signal II) of constant amplitude whose width depends on the type of input pulse generated. This signal II is supplied to the input of the monostable switch step 102 on the one hand, and to the input of the sawtooth generator 3 on the other hand. At the output of the monostable switch step 102 a rectangular voltage (signal II) appears, whose amplitude and duration $t_3$ remains constant. Thus the duration $t_3$ of the pulse is independent from the speed of the engine and/or from the pulse repetition frequency at the input of the circuit. The rectangular pulses (signal III) are supplied to the integrator 103 which in the simplest case may be formed by a capacitor. In FIG. 2 the output of Sawtooth Generator 3 is fed to angle DC-Converter 4. To increase accuracy it is, however, recommended to use a Miller integrator for that purpose. At the output of the integrator 103 a dc voltage (signal IV) is available whose amplitude is proportional to the speed of the engine to be examined and/or to the repetition frequency of the input pulses (signal I).

For the generation of a dc voltage which is proportionate to the speed of the engine, it is possible, according to another embodiment of the invention, to use another device, such as for example, a generator coupled with the engine.

The speed-proportionate DC voltage (signal IV) thus generated is used, according to the invention, for the control of the charging voltage, or else of the resistance or of the capacity of the frequency-determining RC member of the sawtooth generator 3. The variable attenuator 2 provided for that purpose is illustrated in detail in FIG. 3 showing a preferred embodiment of the invention, wherein the variable attenuator influences the charging voltage of the sawtooth generator 3.

The variable attenuator 2 comprises an operational amplifier 201 designed as a differential amplifier whose one difference input 6 is connected to the output of the circuit 1 and whose second difference input 7 is located between the two partial resistances 202, 203 of a voltage regulator connected to the output 8 of the operational amplifier 201. Thus the DC voltage (signal IV) proportionate to the speed of the engine is located at the difference input 6, and the output voltage which also represents the charging voltage for the sawtooth generator 3, at the difference input 7. Thus at the inputs of the operational amplifier 201 the actual value is available on the one hand, and the rated value proportionate to the engine speed on the other hand. This value thus serves as a speed-dependent reference input. The output voltage representing at the same time the charging voltage is thus stabilized to a certain value for a determined speed of the engine. The charging voltage varies as soon as the input quantity (signal I) is altered.

In the embodiment of the invention shown in the drawing (FIG. 4), the sawtooth generator 3 is designed as a Bootstrap circuit. This conventional circuit comprises an RC member with a feedback circuit which serves to linearize the ascent following an "e" function. This feedback circuit is preferably equipped with an amplification factor one. In the embodiment of the invention illustrated in FIG. 4, this feedback circuit comprises an operational amplifier 304 designed as a voltage follower, as a result of which voltage amplification becomes almost 1. At the output of the operational amplifier 304 the sawtooth voltage (signal V) is generated on the one hand and by means of the capacitor 303, whose value has to be at least a hundred times greater than that of the capacitor C, the output voltage for the linearization of the sawtooth on the other hand. This voltage is fed back to the point between the resistance R and the diode 302. The capacitor C is discharged via the transistor 301 controlled by means of the trigger pulse (signal II).

In lieu of the Bootstrap circuit hereabove described any other circuit may conveniently be used for the generation of the sawtooth pulses, provided the resistance R of the RC member or the charging voltage is altered in accordance with the requirement according to the invention to the effect that the amplitude of the sawtooth voltage should be constant over the entire speed range. For example, it is possible to use also a Miller integrator, provided the series resistance R is formed by a transistor, the internal resistance of the transistor being controlled by the speed-proportionate DC voltage.

Figure 6:
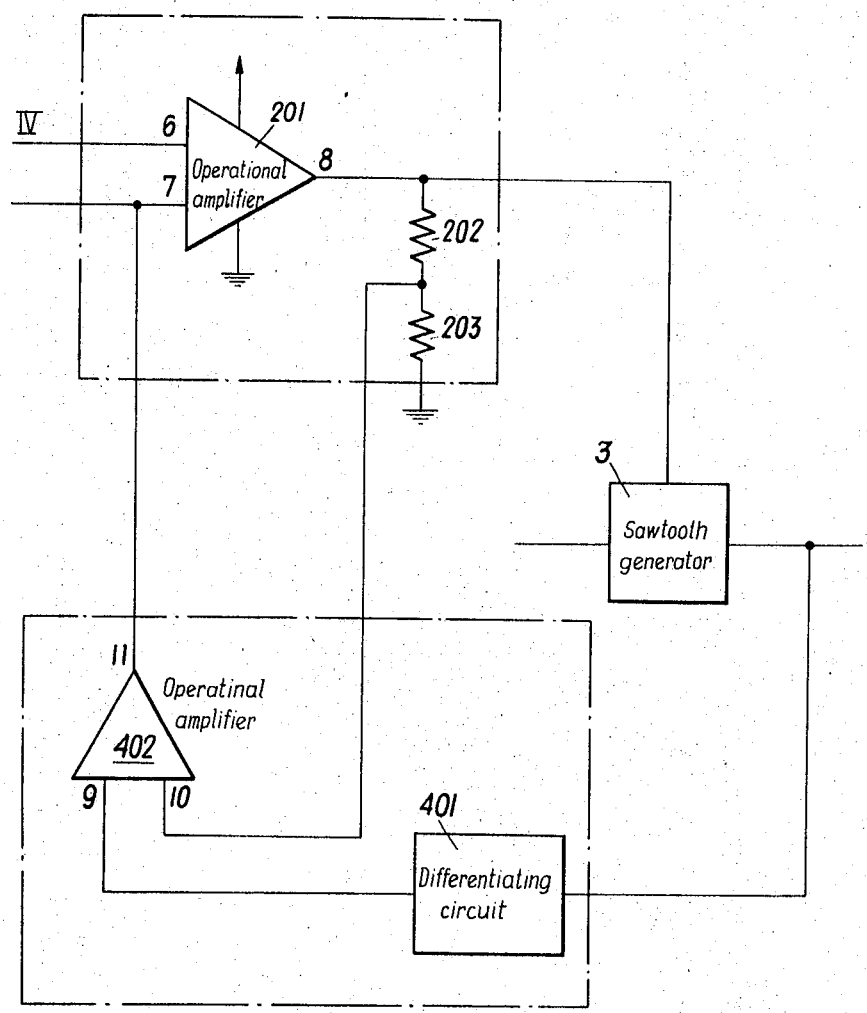

Greater accuracy for the process is obtained by the enlarged circuitry as illustrated in FIG. 6. By determining the slope of the sawtooth pulse and by introducing a DC voltage which is proportionate to the slope for the control of the charging voltage it is possible to substantially increase the accuracy of the relationship between the speed and the slope of the sawtooth pulse. This is achieved by means of an additional feedback control system 4, generating a voltage which is proportionate to the slope of the sawtooth at its output and thereby influencing the charging voltage for the Bootstrap circuit. This feedback control system 4 comprises a differentiating circuit 401 connected to the output of the sawtooth generator 3, a DC voltage being generated at the output of the said sawtooth generator if the sawtooth is symmetrical, the said DC voltage being proportionate to the slope of the sawtooth. The differential of the sawtooth voltage is an approximately rectangular impulse, whereby the output voltage drops to zero during the declining part of the sawtooth and then immediately rises again at the beginning of the new sawtooth to the preceding peak. This DC voltage is supplied to one of the difference inputs 9 of a subsequent operational amplifier 402. The second difference input 10 of the operational amplifier 402 is provided between the partial resistances 202 and 203 of the voltage regulator of the variable attenuator 2. The output 11 of the operational amplifier 402 is connected to the second difference input 7 of the operational amplifier 201. The output voltage of the operational amplifier 402 is a measure for the actual value of the charging voltage and for the actual value of the slope of the sawtooth voltage (signal V).

I claim:
1. A circuitry for the generation of a deflecting voltage proportionate to the speed of an engine, for the time-base deflection of an oscilloscope, comprising a speed sensor mounted on the said engine and generating input pulses having a frequency proportionate to the speed of the engine, a circuit for the generation of a speed-proportionate direct-current voltage, the input of the said circuit being connected to the output of the said speed sensor, the said circuit having a first output generating trigger pulses of the same repetition sequence as the input pulses, and a second output generating the said speed-proportionate direct-current voltage, a sawtooth generator whose input is connected to the first output of the said circuit, a variable attenuator connected to the second output of the said circuit, the output of said variable attenuator being connected to the said sawtooth generator, the said variable attenuator regulating the sweep slope of the sawtooth generator so as to provide a constant amplitude of the sawtooth voltage at all speeds of the engine, the said variable attenuator controls the charging voltage of the said sawtooth generator, the said variable attenuator comprising an operation amplifier having two difference inputs one of which is connected to the output of the said circuit generating the speed-proportionate direct-current voltage, a voltage attenuator connected to the output of the said operational amplifier and consisting of two partial resistances connected in series between the output of the operational amplifier and ground, the second difference input of the operational amplifier being connected to the said voltage attenuator between its two partial resistances, and an additional feedback control system for the control of the slope of the sawtooth voltage generated by the said sawtooth generator, the said feedback control system comprising a differentiating circuit whose input is connected to the output of the sawtooth generator to deliver a square wave amplitude which is proportional to the slope of the sawtooth, a second operational amplifier having two difference inputs one of which is connected to the output of the said differentiating circuit, the second difference input being connected to the said voltage attenuator between its two partial resistances, the output of the said second operational amplifier being connected to the second difference input of the first-mentioned operational amplifier of the said variable attenuator.

* * * * *